(12) United States Patent
Dickfeld

(10) Patent No.: US 8,929,593 B2
(45) Date of Patent: Jan. 6, 2015

(54) METHOD AND DEVICE FOR RECOGNITION OF INFORMATION APPLIED ON PACKAGES

(75) Inventor: Dirk Dickfeld, Alsbach-Hähnlein (DE)

(73) Assignee: Pharmacontrol Electronic GmbH, Zwingenberg (DE)

( * ) Notice: Subject to any disclaimer, the term of this patent is extended or adjusted under 35 U.S.C. 154(b) by 65 days.

(21) Appl. No.: 13/433,583

(22) Filed: Mar. 29, 2012

(65) Prior Publication Data

US 2012/0183178 A1 Jul. 19, 2012

Related U.S. Application Data

(63) Continuation of application No. PCT/EP2010/064112, filed on Sep. 24, 2010.

(30) Foreign Application Priority Data

Sep. 29, 2009 (DE) .......................... 10 2009 044 124

(51) Int. Cl.
*G06K 9/62* (2006.01)
*G06K 7/12* (2006.01)

(52) U.S. Cl.
CPC ........................................ *G06K 7/12* (2013.01)
USPC ............ 382/103; 382/143; 235/491; 209/577

(58) Field of Classification Search
None
See application file for complete search history.

(56) References Cited

U.S. PATENT DOCUMENTS

| | | | | |
|---|---|---|---|---|
| 3,800,282 | A * | 3/1974 | Acker | 382/182 |
| 6,123,263 | A * | 9/2000 | Feng | 235/462.42 |
| 6,301,380 | B1 * | 10/2001 | Mullins et al. | 382/141 |
| 2001/0032805 | A1 * | 10/2001 | Lawandy et al. | 209/3.3 |
| 2001/0035261 | A1 * | 11/2001 | Banahan | 156/277 |
| 2005/0156046 | A1 * | 7/2005 | Goldenberg | 235/462.13 |
| 2005/0211914 | A1 | 9/2005 | Franken et al. | |
| 2007/0119949 | A1 * | 5/2007 | Hattersley et al. | 235/472.01 |
| 2007/0257118 | A1 * | 11/2007 | Riley et al. | 235/494 |

FOREIGN PATENT DOCUMENTS

CA 2375577 A1 9/2003

* cited by examiner

*Primary Examiner* — Jon Chang
(74) *Attorney, Agent, or Firm* — Standley Law Group LLP

(57) ABSTRACT

Embodiments describe a system and method for reading the information on bundled packages wrapped in transparent film. The film can obscure information on the outside of the packages making the automated identification and tracking of the packages difficult. Embodiments described herein provide a system and method for capturing the unique information regardless of the obscuring effects of packaging films. A camera that is insensitive to UV light captures visible light emitted by labels after the labels are irradiated by UV light. The light emission induces greater contrast overcoming any distortion that might have occurred due to the transparent packaging film.

16 Claims, 1 Drawing Sheet

METHOD AND DEVICE FOR RECOGNITION OF INFORMATION APPLIED ON PACKAGES

CROSS-REFERENCE TO RELATED TO APPLICATIONS

This application is a continuation under 35 USC §120 of PCT/EP2010/064112, filed 24 Sep. 2010, which is in turn entitled to benefit of a right of priority under 35 USC §119 from German patent application 10 2009 044 124.7, filed 29 Sep. 2009. The content of each of the applications is hereby incorporated by reference as if fully recited herein.

TECHNICAL FIELD

The disclosed embodiments are in the field of recognition of identification information and more particularly in the field of package identification and tracking.

BACKGROUND

Particularly in the pharmaceutical industry there is a necessity to identify pharmaceutical products uniquely based on information that is applied to the packaging. For this purpose relevant information is routinely printed on the front side of a packaging box. This information might include a product number, a lot number, an expiration date, and perhaps a number identifying the specific product. By recording the printed information and its evaluation, every individual package and therewith the product in it can be followed from the company manufacturing it via distribution channels to the end user. In this way counterfeit medicines can more easily be recognized and their use by the end user can be avoided.

Automatic information collection systems are known that can produce reproductions of the package area containing the information in order to evaluate the information on it. Such systems often comprise a camera or a different device to produce an image that produces a reproduction and transmits it to a suitable, often digital, evaluation device.

Increasingly, however, both individual folded boxes and in particular assembly packs that include several folded boxes are enclosed by a transparent film and where applicable combined into a unit and protected during transportation up to the sale to an end user. The package is not opaquely covered by the transparent film, often a cellophane film. The information printed on the package can be recognized and evaluated through the transparent film.

It has emerged, however, that the automatic recognition procedure known in past practice cannot reliably recognize and evaluate the information provided on the package if the area of the package showing the information is covered by cellophane. In the first place, undesirable mirroring and reflections occur that are caused by the encasing cellophane film or are at least distorted by it and which thereby hinder automatic evaluation by recording using a camera. In the second place the cellophane film is not always smooth on the surface of the package and may possibly have folds and waves that can produce additional reflections and distort an image of the area of the package under it.

Taking several pictures staggered in time of the area of the package showing the information is known, whereby the illumination is from various directions and the disturbing influence of distortion and reflections can be reduced by a comparison of several images. However, producing several camera images with differing illumination and the subsequent processing of images is wasteful, laborious and costly.

Illumination using polarized light on the package area showing the information and evaluation of the camera images produced with polarized light is also known. It has been shown, however, that in many cases the cellophane film can influence the polarization of the light so that the camera images produced with polarized light and in particular their evaluation may additionally be interfered with or altogether thwarted.

SUMMARY

The difficulties presented by conventional image capture systems are solved with a method and an apparatus having the features described in the claims. Further advantageous embodiments are presented in the dependent claims.

Disclosed embodiments describe a system and method for capturing identifying information from a readable area of a package. The system comprises at least one UV radiation source exciting a readable are of a package while the package is wrapped in a transparent film. The UV illumination causes portions of the readable area to luminesce contrasting with portions comprising printed information. An image providing device such as a camera then captures the identifying information from the readable area of the package. Preferably, the camera does not capture UV light from the light sources.

Disclosed embodiments describe a method for the automated recognition of information applied to packages. The method comprises providing a package with a readable package area. The area comprising a luminescent substance and identifying markings in the readable package area, wherein the readable package area is obscured by a transparent film. Moving the readable area of the package into a viewable area of an image providing device, illuminating the package area with UV light and capturing a visible light image of the package area with the image providing device. Further, the image captured is subsequently evaluated.

BRIEF DESCRIPTION OF THE DRAWING

The method and the apparatus according to the disclosed embodiments are described through examples which are illustrated schematically in the drawings, wherein.

DETAILED DESCRIPTION OF PREFERRED EMBODIMENTS

Figure 1:
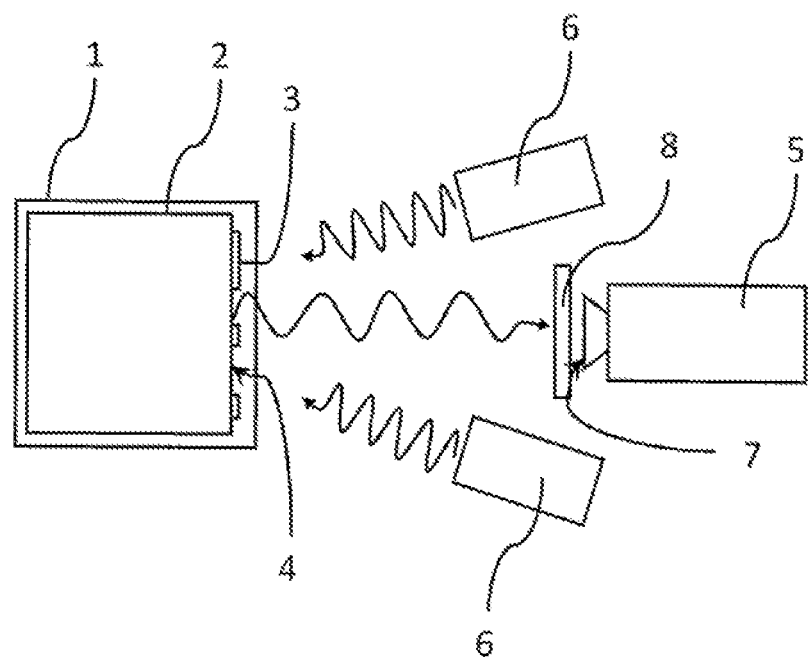
FIG. 1 shows an arrangement for a recognition system and a package with a readable area according to the disclosed embodiments.

Issues with the identification of packages wrapped in transparent films are solved by the disclosed embodiments. Information in a readable area of the package is illuminated with ultraviolet light (UV light or UV radiation) through the transparent film causing the area to luminesce while the film does not. The emission of light from the readable area of the package is then captured and evaluated with an image providing device that is not sensitive to UV radiation. A luminescing surface of the area of the package is excited by illumination with UV radiation and emits visible light, normally light in a blue or green area of the spectrum.

UV radiation can largely penetrate the transparent film and excite the surface of the package area under it to luminescence. The mostly homogeneously excited emission of luminescing light is strongly diminished or completely covered in the areas printed with information so that the printed information shows dark areas in the luminescing area of the package that can be captured and evaluated with the image providing device. This luminescence increases the contrast between the printed information on the package and the background of the readable package area.

The part of the UV radiation reflected by the transparent film or the surface of the package area under it is, on the other hand, not captured by the image providing device and thus cannot interfere with or obscure recognition of the information or its evaluation.

The process according to the invention may include a luminescing surface coating of the readable area of the package showing the information. The readable area may comprise a luminescent coating and printed information within a readable area. The printed information hinders or prevents the UV radiation from reaching segments of the readable area, thereby, the printed information is contrasted with the luminescing remainder of the readable area. The contrast between the printed information and the luminescing coating is then captured by an image providing device such as a digital camera.

In the case of pharmaceutical packaging, those in the industry almost exclusively use packages with a white, homogeneous, uncoated carton surface, whereby the white color is reinforced with optical brighteners or whiteners that regularly contain fluorescing substances. In order to increase the luminescing emission; the surface of the area of the package or its coating should receive a minimum of fluorescing or phosphorescing agents. It is also possible that before printing the information an additional large coated area could be provided with luminescence or agents promoting luminescence. It is also possible that the information could be printed with a light color on a dark background, whereby the light color contains ingredients producing luminescence.

The surrounding transparent film is largely transparent both to visible light and UV radiation. This is regularly the case with films typically used in packaging and particularly with cellophane film. The process according to the invention can be used with almost all transparent films if sufficient transparency is provided for a usable area of the spectrum for UV radiation.

Since the device providing the image does not capture the UV light, reflections and/or scattering effects are mostly blocked by the illumination of the area of the package with UV light and cannot disturb or notably influence the recognition of the information.

According to an embodiment, the device providing the image produces at least a complete image of the area of the package that is subsequently evaluated. In this way complete information on a package or of an assembly pack with a plurality of packages contained in it can be captured in a brief time. In this way, automated recognition is possible allowing capture of package information for many packages on, for example, an assembly line. Recognition and evaluation of the image produced in this way can be done at a later time as desired.

According to another embodiment, the device providing the image continually captures image lines extending transversely across the readable area of the package that are continually captured for subsequent evaluation. That is easily realizable economically by means of continual recognition of image lines with a normal commercial line scanner or similar device. The area of the package showing the information of a moving package can be captured and subsequently evaluated. The individual packages or assembly pack can continually be transported past the device providing the images. In this way recognition of the printed information can be carried out during the manufacturing or packing process without having to position each individual package at a standstill in the area of the image providing device. The invention also concerns a device for recognition of information provided on packages.

According to an embodiment the device comprises a source of light emitting UV radiation for illumination of an area of a package showing the information and an image providing device for capture of the light emissions emanating from this area of the package, whereby the image providing device is insensitive to the UV radiation. The UV light source can, for example, be located next to the image providing device at a distance from the area of the package showing the information so that only the area of the package is illuminated and no UV light is directed at the image providing device from the UV light source. Crosstalk of the illumination into the image providing device is thus prevented for the most part. The UV light emitted by the light source excites the surface of the area of the package that is illuminated to luminesce as homogeneously as possible. Only the luminescent light radiated from the area of the package is captured by the image providing device and not the UV radiation radiated from the UV light source and possibly reflected or scattered UV radiation. The printed information prevents the emissions of luminescence in the areas with printed information in the area of the package and can be recognized and evaluated with a suitable evaluation procedure.

In an embodiment, the image providing device is a camera. Particularly a digital camera can quickly capture an image of the area of the package in sufficient resolution in a brief time and present this image in digital form so that the produced digital data can be stored and subsequently be prepared and evaluated where appropriate.

According to an embodiment of the invention, the image providing device features a filter opaque to UV radiation. UV light emitted from the UV light source and possibly reflected from the surface of the package is filtered out with the filter opaque to UV that is located immediately in front of the camera or the image providing device, so that it does not interfere with the capture of the image of the readable area of the package. In this way commercial cameras or CCD sensors can be used that would be interfered with by penetrating UV light without the use of a filter opaque to UV.

Furthermore, the image providing device may include additional filter devices so that the luminescent light excited by the UV illumination is captured only by the image providing device and is used for the subsequent evaluation.

An exemplary embodiment that is depicted in the drawing will be clarified in more detail.

FIG. 1 shows an embodiment of an exemplary system for capturing information from a readable area of a package. A folded box 2 covered with a single or multiple layers of transparent film 1 that forms a package for a pharmaceutical product, the package includes a readable package area 4 with printed information 3. A camera 5 is located and oriented at a distance from package area 4 so that camera 5 can produce a complete image of the area of the package 4 having the information thereon.

In an embodiment, two light sources emitting UV radiation 6 are arranged next to camera 5. The package is moved into a viewable area of the image providing device and the readable package area 4 is illuminated essentially homogeneously, by the light sources, with UV radiation. The UV radiation penetrates transparent cellophane film 1 and excites a fluorescing coating on the folded box 2 in the readable area of package 4 to luminescence or in particular to fluorescence. The luminescing light emitted by package area 4 in the direction of camera 5 is captured by camera 5.

Additionally, a UV-opaque filter 8 may be situated directly in front of a lens or operating opening 7 of camera 5 so that no UV radiation can penetrate the opening 7 into camera 5 and influence or distort the image of the readable package area 4 of the folded box 2. In this way interfering reflections are avoided.

The readable area may comprise a label or package surface with a coating including luminescing agents. The area will generally have identifying information, often in the form of a barcode, readable text or some other form of identification printed within the readable area. This identifying information is often printed with dark ink. The ink necessarily obscures the UV light from the light sources creating a contrasting image of light (the luminescing areas) and dark (the printed information). This image is recognizable by the image providing device and does not suffer from the distorting effects of the transparent film.

The areas of package area 4 that usually have black or dark printing 3 emit considerably less or almost no luminescent light with UV radiation and are thus detected by camera 5 as dark areas in luminescent package area 4. Camera 5 produces an image of the luminescent emission excited by the UV radiation that can be subsequently processed and evaluated with suitable evaluation procedures and equipment.

Although the invention has been described by presenting specific exemplary embodiments, it is obvious that numerous further variants could be created based on knowledge of the present invention, for example by combining the features of the individual examples of embodiments with each other and/or by interchanging individual functional units between the embodiments.

What is claimed is:

1. A method for the automated recognition of information applied to packages comprising:
    providing a package with a readable package area comprising a luminescent substance and identifying markings in the readable package area, wherein the readable package area is obscured by a transparent film;
    moving the readable area of the package into a viewable area of an image providing device;
    illuminating the package area with UV light, causing the package area to luminesce while the transparent film does not luminesce;
    capturing a visible light image of the package area with the image providing device which continually captures an image line extending transversely over the package area.

2. The method of claim 1 further comprising a UV filter positioned between the image providing device and the package.

3. The method of claim 1 further comprising the step of evaluating the captured image.

4. The method of claim 1, wherein the image providing device produces at least one complete image of the readable package area that is subsequently evaluated.

5. The method of claim 4 further comprising the step of evaluating the captured image.

6. The method of claim 1 wherein the image providing device is a digital camera.

7. The method of claim 6 wherein the package is illuminated with UV light from a plurality of UV light sources.

8. The method of claim 7 wherein the readable package area comprises a coating comprising a luminescent agent.

9. The method of claim 8, wherein the identifying markings cover a portion of the luminescent coating of the readable package area.

10. The method of claim 8, wherein the image providing device produces at least one complete image of the readable package area that is subsequently evaluated.

11. The method of claim 6 further comprising the step of evaluating the captured image.

12. A device for the automated recognition of a information in a readable package area, the information applied to bundled packages wrapped in transparent film, comprising:
    a light source emitting UV radiation to illuminate a readable package area of the bundled package through the transparent film; and
    an image providing device to capture light emissions from the package area by continually capturing an image line extending transversely over the package area, whereby the image providing device is insensitive to UV radiation.

13. The device of claim 12, wherein the image providing device is a camera.

14. The device of claim 13, wherein the image providing device produces at least one complete image of the readable package area that is subsequently evaluated.

15. The device of claim 12, wherein the image providing device further comprises a filter opaque to UV radiation.

16. The device of claim 12 comprising a plurality of light sources emitting UV radiation.

* * * * *